United States Patent [19]

Hashimoto

[11] 4,426,145

[45] Jan. 17, 1984

[54] LENS SHUTTER CAMERA

[75] Inventor: Akihiko Hashimoto, Hachioji, Japan

[73] Assignee: Olympus Optical Company, Ltd., Tokyo, Japan

[21] Appl. No.: 385,841

[22] Filed: Jun. 7, 1982

[30] Foreign Application Priority Data

Aug. 10, 1981 [JP] Japan .............................. 56-125540
Aug. 10, 1981 [JP] Japan .............................. 56-125541

[51] Int. Cl.³ ............................ G03B 3/10; G03B 9/08
[52] U.S. Cl. ................................ 354/195.1; 354/233; 354/265; 354/234.1
[58] Field of Search ............... 354/25 R, 25 N, 195, 354/233, 234, 235, 251, 261, 264, 265

[56] References Cited

U.S. PATENT DOCUMENTS

| 4,294,527 | 10/1981 | Hashimoto et al. | 354/25 R |
| 4,348,089 | 9/1982 | Shenk | 354/195 |
| 4,360,258 | 11/1982 | Hashimoto | 354/234 |

Primary Examiner—A. A. Mathews
Attorney, Agent, or Firm—Weinstein & Sutton

[57] ABSTRACT

A lens shutter camera includes a distance adjusting mechanism which is operated by the rotation of a single ring in one direction as it is driven by a drive source such as a motor. A distance adjustment is performed by a movement of a movable taking lens barrel in the direction of an optical axis thereof. Rotation of the ring in the other direction operates a lens shutter mechanism to open the shutter blades. A shutter closing spring is charged by a shutter controlling electromagnet, and is enabled to close the shutter blades.

26 Claims, 10 Drawing Figures

LENS SHUTTER CAMERA

BACKGROUND OF THE INVENTION

The invention relates to a lens shutter camera, and more particularly, to such a camera having a distance adjusting mechanism which causes a taking lens to move in the direction of an optical axis by means of a drive source such as motor, and also having a lens shutter mechanism for opening and closing shutter blades disposed within a barrel associated with the taking lens.

In the prior art, a distance adjusting mechanism which performs a distance adjustment of a camera by utilizing a motor is constructed in a manner such that the motor is maintained in coupled relationship with a distance ring through a gearing. Hence, a position assumed by the distance ring and corresponding to a selected distance is uniquely determined by the angular position where the motor stops. Such a mechanism is liable to malfunctioning, and since the motor is maintained in operative coupling with the distance adjustment, it cannot be freely utilized for other operations such as a shutter operation, for example.

As an alternative, distance adjusting means may include a detent pawl which leaves the distance ring at a selected position corresponding to a desired distance after the ring has been driven to such location by the motor, while releasing the motor. However, to change the distance setting, the engagement between the pawl and ring must be released, requiring a complex mechanism which adds to the space requirement of a camera. Also, a malfunctioning is frequently caused.

In the prior art, a lens shutter mechanism is known which is controlled for opening and closing by a self-charging operation. A mechanism of this type involves an increased stroke and requires an increased force for the depression of a shutter release. While a variety of proposals have been made to facilitate a shutter operation by utilizing a motor, it is essential when operating the shutter with the motor that the motor be fed with a constant voltage to maintain a constant speed of rotation and that a rapid shutter closing operation be enabled. The shutter opening operation may take place at a relatively slow rate of 30 m/sec, for example, and hence it is a simple matter to control the shutter opening by the rotation of the motor. However, it is difficult to achieve a very rapid shutter closing operation through the motor control in response to an exposure terminate signal. If the shutter closing operation is slowed, there results an error in the exposure period. The shorter the exposure period, the greater the magnitude of the error.

To effect a shutter charging operation after the shutter has been closed, a conventional lens shutter mechanism utilizing a motor requires the provision of an increased number of members or elements which are ganged with the motor and which must undergo a complicated operation with respect to the rotation of the motor.

SUMMARY OF THE INVENTION

In view of the foregoing, it is an object of the invention to provide a lens shutter mechanism including a distance adjusting mechanism including a cam which is mounted on a lens barrel and stepped in the direction of an optical axis thereof and which is engaged by a guide pin mounted on a stationary member to cause a displacement of the barrel in the direction of the optical axis when the barrel is driven for rotation by drive source such as motor, and also including a lens shutter mechanism having blade operating means coupled to shutter blades and engaging a cam formed on a ring which is rotatable about the optical axis of a taking lens so that a shutter opening operation takes place by a rotation of the ring when driven by a drive source such as by motor while maintaining the blade operating means held attracted to an electromagnet and a shutter closing operation takes place rapidly by operating the blade operating means when it is released from the electromagnet, independently from the angular position of the ring.

In accordance with the invention, the stepped cam formed on the lens barrel engages the guide pin mounted on a stationary member to cause a movement of the lens barrel in the direction of the optical axis thereof as the barrel is rotated, thereby achieving a stepwise distance adjustment in terms of zone focus. Hence, any error in the rotation of the motor which might be caused by fluctuations in the voltage and the temperature cannot interfere with an intended distance adjustment, which is positively achieved with a very simple arrangement. In this manner, the space requirement is minimized to allow the construction of a compact camera. The starting and the terminating end of the stepped cam are connected together through a cam groove so as to completely surround the periphery of the lens barrel, thus allowing rotation of the motor in one direction to move the lens barrel either forwardly or rearwardly, thus facilitating a distance adjustment.

Also, in accordance with the invention, blade operating means connected to shutter blades is engaged with the cam formed on the ring which is rotatable about the optical axis of the taking lens. A shutter opening operation takes place by causing a drive source such as motor to rotate the ring while maintaining the blade operating means held attracted to an electromagnet. A shutter closing operation takes place by the operation of the blade operating means which is released from the attraction of the electromagnet, independently from the angular position of the ring, allowing a rapid shutter closing operation to minimize an exposure error. Accordingly, this arrangement is particularly useful with a camera of direct photometry type which utilizes a lens shutter. An arrangement to open or close the shutter blades is greatly simplified and a compact unit can be obtained, as compared with a conventional lens shutter mechanism which utilizes a motor, since the blades can be open or closed by an operation of the blade operating means in the form of simple arm, lever or the like which is connected to the cam groove and the electromagnet and which responds to a movement of the cam groove as driven by the motor or to the energization or deenergization of the electromagnet.

DESCRIPTION OF EMBODIMENTS

Figure 1:
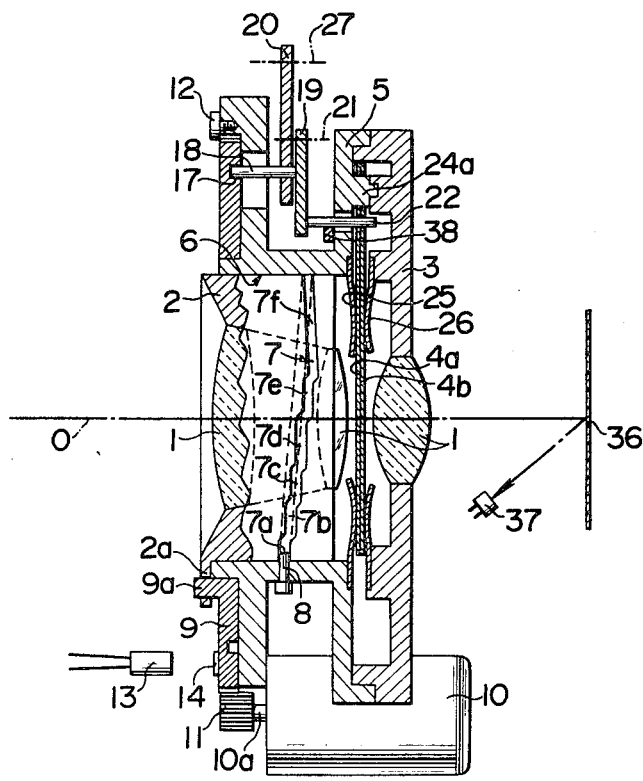
FIG. 1 is an elevational section of part of a distance adjusting mechanism and a lens shutter mechanism used in a lens shutter camera according to one embodiment of the invention.
Figure 2:
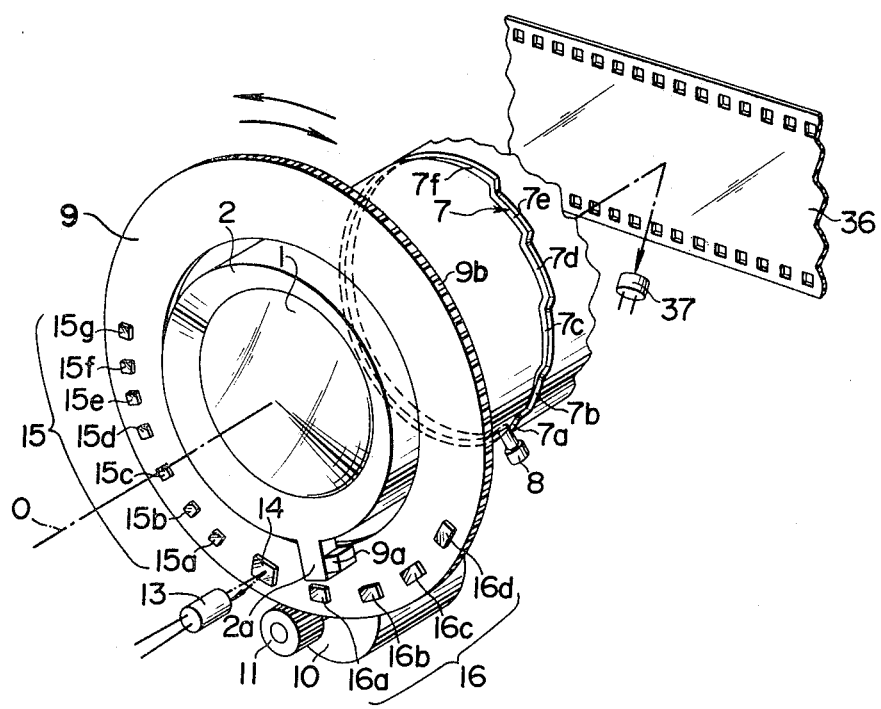
FIG. 2 is a perspective view of part of the distance adjusting mechanism shown in FIG. 1.

FIGS. 1 and 2 are an elevational section and a perspective view of part of a lens shutter camera according to one embodiment of the invention. Specifically, a taking lens assembly 1 includes a plurality of lens elements which are mounted in a front lens barrel 2 and a rear lens barrel 3, between which a pair of shutter blades 4a, 4b (see FIGS. 3 to 5) are disposed. The rear lens barrel 3 is secured to a body 5 of the camera, while the front lens barrel 2, which is cylindrical in configuration, is fitted into a sleeve 6 formed integrally with the body 5 so as to be rotatable with respect to the body and movable in either direction along an optical axis 0. An annular cam groove 7, which is used for a distance adjustment, is formed in the full peripheral surface of the front lens barrel 2, and is engaged by a guide pin 8 which is mounted on the lower part of the body 5 in axially opposing relationship with the groove 7. As viewed from the front side, the cam groove 7 comprises five upright stepped cams 7a to 7e which are formed on the right-hand side of the front lens barrel 2 in a stepwise offset manner from bottom to the top thereof, generally retracting in the rearward direction, and a rectilinear cam 7f which extends along the left-hand side of the front lens barrel 2 to connect the stepped cams 7e and 7a together. Consequently, when the front lens barrel 2 is rotated clockwise, as viewed from the front side, the guide pin 8 is sequentially engaged with the stepped cams 7a to 7e, thereby feeding the front lens barrel 2 forward in a stepwise manner. During a continued rotation of the lens barrel 2 in the same direction, the rectilinear cam 7f returns the lens barrel 2 rearwardly in a continuous manner until it resumes its original position. It is to be understood that the stepped cams 7a, 7b, 7c, 7d and 7e correspond to distances of ∞, 3 m, 2 m, 1.5 m and 1 m, respectively.

Toward its front side and on its lower end, the front lens barrel 2 is formed with tab 2a, which is engageable with a lug 9a projecting from the front surface of a ring 9 which is mounted on the front surface of the body 5 so as to be rotatable about the optical axis 0 of the taking lens 1. The outer periphery of the ring 9 is formed with gear teeth 9b. In a region adjacent to the bottom of the ring 9, the teeth on the ring 9 mesh with a drive gear 11 fixedly mounted on the drive shaft 10a of a motor 10 which is mounted on the bottom of the body 5, whereby the rotation of the motor 10 causes the ring 9 to move angularly about the optical axis 0. The relative position of the lug 9a and the tab 2a is chosen such that the lug 9a is located on the right-hand side of the tab 2a initially. As the motor 10 rotates in the forward direction to cause the ring 9 to rotate clockwise, the lug 9a engages the tab 2a to permit the front lens barrel 2 to be driven in the same direction in an integral manner with the ring 9. Conversely, when the motor 10 rotates in the reverse direction to cause a counter-clockwise rotation of the ring 9, only the ring 9 rotates without any engagement between the lug 9a and the tab 9a, thus maintaining the front lens barrel 2 stationary. As will be described later, a clockwise rotation of the ring 9 achieves a distance adjustment while a counterclockwise rotation of the ring 9 achieves a shutter operation. The ring 9 is formed of a relatively thin metal sheet, and to prevent a swing and tilt during its rotation, a plurality of screws 12 are mounted on the front surface of the body 5 and have dished heads slidably engage the ring 9 along the outer periphery thereof.

On its front surface, the ring 9 is formed with a reflector zone 14 having a relatively high reflectivity, of 90%, for example, and when the ring 9 assumes its initial position, a photo-coupler 13 is disposed in opposing relationship therewith in order to detect the annular position of the ring 9. The photo-coupler 13 may be of any known form. Referring to FIG. 2, it will be noted that a reflector assembly 15 including a plurality of reflector zones 15a to 15g having a reflectivity which is approximately one-third that of the reflector zone 14, for example, a reflectivity of 30%, is disposed to the left of the reflector zone 14 for purpose of a shutter control. On the other hand, another reflector assembly 16 including a plurality of reflector zones 16a to 16d having a reflectivity which is approximately one-third that of the reflector zone 14 is disposed to the right of the reflector zone 14 for purpose of distance adjustment. It is to be understood that the front surface of the ring 9 other than the reflector assemblies 14, 15, 16 have a reflectivity which is substantially less than the reflectivities mentioned above, for example, a reflectivity of 5%. Each of the reflector zones 15a to 15g corresponds to a diaphragm value of F22, 16, 11, 8, 5.6, 4 and 2.8, respectively, and each of the reflector zones 16a to 16d corresponds to a photographing distance of 3, 2, 1.5 and 1 m, respectively. The photographing distance of infinity is detected by the reflector zone 14. Specifically, in the initial condition of the ring 9 where the reflector zone 14 is located opposite to the photo-coupler 13, the front lens barrel 2 is fed to its forwardmost position and the stepped cam 7a is engaged by the guide pin 8.

When the photo-coupler 13 receives light reflected by the reflector zone 14, it produces a photocurrent $i_0$ of a high magnitude, which allows the initial position of the ring 9 to be detected. When the photo-coupler 13 receives light reflected by the reflector assemblies 15, 16, it produces a photocurrent i of a magnitude which is one-third of the magnitude $i_0$, whereby the output then produced by the photo-coupler 13 can be discriminated from the detection of the initial position. The rotation of the ring 9 in either clockwise or counter-clockwise direction can be counted in terms of pulses, thereby allowing a detection thereof.

Figure 3:
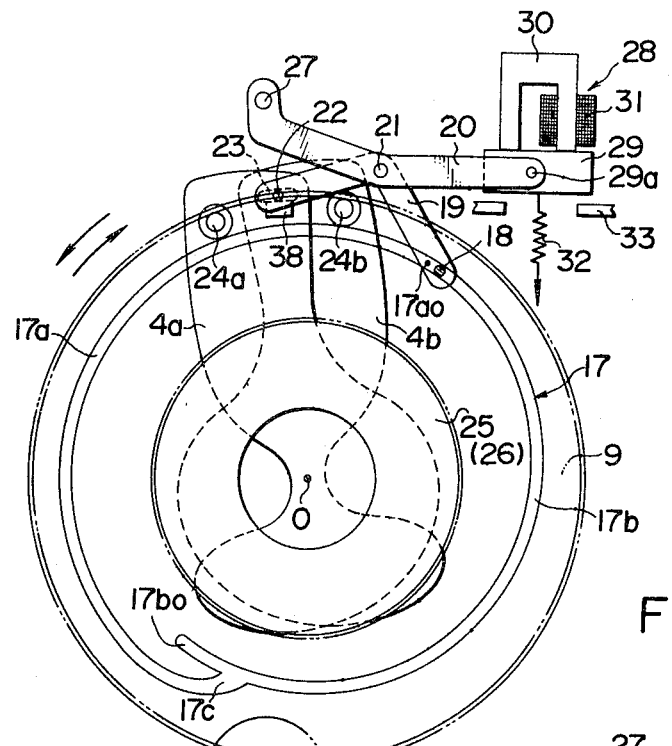
FIGS. 3 to 5 are front views of the lens shutter mechanism shown in FIG. 1, illustrating an initial condition, a shutter opening operation and a shutter closing operation thereof.

Annular, shutter controlling cam groove 17 is formed in the rear surface of the ring 9 and is shaped as illustrated in FIG. 3, when viewed from the front side thereof. A cam portion 17a of the cam groove 17 which extends substantially over the left-hand half lies an equal distance from the optical axis while a cam portion 17b extending over the right-hand half is contiguous with the cam portion 17a at its top end and then follows a locus which gradually approaches the optical axis 0. The lower end 17b$_0$ of the cam portion 17b is closed while the lower end of the cam portion 17a is curved in a direction toward the optical axis 0 and communicates with the cam portion 17b in a coupling region 17c.

When the ring 9 assumes its initial position, the cam groove 17 is engaged by a pin 18 at a point adjacent to the connection 17a₀ between the cam portions 17a, 17b. The pin 18 is fixedly mounted on the free end of one arm of a blade opening and closing, drive lever 19 which is L-shaped and which is pivotally mounted, by a pin 21, on a blade opening and closing, drive arm 20 intermediate its length. The free end of the other arm of the lever 19 fixedly carries a drive pin 22 which extends through elongate slots 23 formed in one end of both shutter blades 4a, 4b, whereby the 19 is connected with the shutter blades 4a, 4b. The pair of shutter blades 4a, 4b define a shutter of vario type which is known in itself. These blades are pivotally mounted on the body 5 by means of pivot pins 24a, 24b which are formed thereon adjacent to said one end. Accordingly, as the drive pin 22 moves upward, the blades 4a, 4b are opened while they are closed as the drive pin returns downward. When the blades 4a, 4b are closed, the drive pin 22 bears against a stop 38 provided on the body 5. The stop 38 is formed by an elastic member to act as a shock absorber as the shutter blades 4a, 4b are closed.

A pair of light shield members 25, 26 are disposed forwardly and rearwardly of the pair of shutter blades 4a, 4b. The front light shield member 25 is mounted on the rear end face of the cylindrical portion of the body 5 while the rear light shield member 26 is mounted on the front end face of the rear lens barrel 3. The pair of light shield members 25, 26 are formed by doughnut-shaped, very thin, black plastic plates having a relatively good resilience such as epoxy resin, for example. As will be noted from FIG. 1, their opposing surfaces are clear from the shutter blades 4a, 4b along the inner and the outer peripheral edges while they gently contact the blades 4a, 4b intermediate their radial width under the resilience of the light shield members 25, 26. In this manner, the light shield members 25, 26 are effective to prevent a light leakage through the pair of shutter blades 4a, 4b and to prevent a fluttering of the blades as they are either opened or closed, thus assuring a smooth movement of the blades. The pressure with which the light shield members 25, 26 are urged against the shutter blades 4a, 4b is of a small magnitude which prevents substantially any adverse influence upon the movement of the blades.

One end of the drive arm 20 is pivotally mounted by a support pin 27 which is in turn mounted on a stationary member, not shown. The other end of the arm 20 is connected to the armature 29 of a control electromagnet 28 by means of a pivot pin 29a. The electromagnet 28 includes a yoke 30 which is secured to a stationary member (not shown), and also includes a coil 31 which may be energized to attract the armature 29. A spring 32 extends between the armature 29 and a stationary member to urge the armature in a direction to oppose the attraction of the electromagnet 28. However, it should be understood that the bias applied by the spring 32 is less than the attraction exerted by the electromagnet 28. Consequently, when the ring 9 moves angularly in a direction to open the shutter blades 4a, 4b and the coil 31 ceases to be energized, the spring 32 causes the armature 29 to be moved away from the yoke 30 and into abutment against a stop 33.

Referring to FIG. 1, a light receiving element 37, used for purpose of photometry, is disposed in opposing relationship with a film 36, and is located at a position rearwardly of the rear lens barrel 3 so as to avoid an interference with a taking light path. The element 37 determines light from an object being photographed which is reflected by the film surface as the light has transmitted through the taking lens 1.

In operation, a distance adjustment takes place before a shutter operation occurs. During a distance adjustment, a switch, not shown, is operated to cause the motor 10 to rotate in the forward direction. This causes the pinion 11 to rotate counter-clockwise, whereby the ring 9 rotates clockwise. The ring 9 assumes its initial position illustrated in FIG. 2 until it initiates the rotation, and thus the reflector zone 14 is located opposite to the photo-coupler 13. Accordingly, as the ring 9 begins to rotate clockwise, the reflector zones 16a, 16b . . . of the reflector assembly 16 sequentially pass by the photo-coupler 13, whereby an output pulse of photocurrent i from the photo-coupler 13 is counted by an electrical circuit, not shown. The clockwise rotation of the ring 9 causes the lug 9a thereon to engage the tab 2a, whereby the front lens barrel 2 rotates clockwise in an integral manner with the ring 9. Since the front lens barrel 2 has the cam groove 7 in which the guide pin 8 is fitted, the clockwise rotaton causes the lens barrel 2 to be fed forwardly in an intermittent manner. Assuming that a photographing distance of 2 m is preset, when two pulses of photocurrent i from the photo-coupler 13, produced by the reflected light from the reflector zones 16a and 16b, are counted during the clockwise rotation of the ring 9, the electrical circuit (not shown) produces an instruction which causes the rotation of the motor 10 to be interrupted. At this time, the step cam 7c is located against the guide pin 8, and thus the rotation is interrupted when the front lens barrel 2 has been fed in a forward direction to a position corresponding to the photographing distance of 2 m. Since the motor 10 has inertia, the ring 9 and the front lens barrel 2 may not immediately cease their rotation in response to the instruction. However, since each of the stepped cams 7a to 7e extends perpendicular to the optical axis 0 and has a certain length, no fore-and-aft movement of the front lens barrel 2 occurs during the time each step cam engages the guide pin 8. If the front lens barrel 2 tends to continue to rotate, the step formed between adjacent step cams bears against the guide pin 8, thus positively ceasing the rotation of the front lens barrel 2. In this manner, the camera can be reliably focussed to a desired photographing distance. It will be understood that such desirable distance adjustment takes place satisfactorily even fluctuation in a voltage and a temperature causes any slight offset in the position where the motor 10 stops it rotation.

The clockwise rotation of the ring 9 is also accompanied by rotation of the cam groove 17 formed therein in the same direction, so that the pin 18 moves through the cam portion 17a. Because the cam portion 17a is formed to be equidistant from the optical axis 0 or the center of rotation of ring 9, the position of the pin 18 remains unchanged during the clockwise rotation of the ring 9. While the pin 18 remains within the cam portion 17a, the drive arm 20 which is connected to the drive lever 19 through the pin 21 assumes its most counter-clockwise position, thus maintaining the armature 19 in abutment against the cooperating surface of the yoke 30 of the electromagnet 28 which is now deenergized, against the bias applied by the spring 32. At this time, the drive lever 19 assumes its most counter-clockwise position about the pin 21, bringing the drive pin 22 downward or toward the optical axis 0, into abutment against the stop 38. Hence, the pair of shutter blades 4a, 4b remain closed. In other words, during the time the ring 9 rotates clockwise for purpose of a distance adjustment, the pin 18 remains stationary at a position which is most removed from the optical axis 0, maintaining the shutter blades 4a, 4b closed from the very beginning of the distance adjustment.

Upon termination of the distance adjustment, the motor 10 is driven to rotate in the reverse direction. This causes the pinion 11 to rotate clockwise, whereby the ring 9 rotates counter-clockwise. As the ring 9 begins to rotate counter-clockwise, the lug 9a moves away from the tab 2a, thus allowing the ring 9 to rotate independently of lens barrel 2 while maintaining the front lens barrel 2 at an angular position which corresponds to the photographing distance of 2 m. As the ring 9 rotates counter-clockwise, the reflector zones 16b, 16a of the reflector assembly 16 sequentially pass by the photo-coupler 13, and the corresponding output pulses of photocurrent i therefrom are not utilized to control the motor 10. However, when the ring 9 reaches the initial position illustrated in FIG. 2 and the photo-coupler 13 reflects reflected light from the reflector zone 14, the output pulse which represents the resulting photocurrent $i_0$ from the photo-coupler 13 interrupts the rotation of the motor 10. In this manner, the distance adjustment is completed and the ring 9 is returned to its initial position.

Subsequently, when a shutter release switch is operated, the motor 10 again begins to rotate in the reverse direction, allowing the ring 9 to rotate counter-clockwise from the initial position. The angle through which the ring 9 rotates from its initial position is determined by an output from the photometric element 37 if the shutter blades 4a, 4b are to operate as a programmed shutter, and is determined by a diaphragm value manually preset by a user if the blades are to operate as a diaphragm preset shutter. As the ring 9 rotates from its initial position where the reflector zone 14 is located opposite to the photo-coupler 13, and the reflector zones 15a, 15b ... of the reflector assembly 15 sequentially pass by the photo-coupler 13, the reflected light therefrom is incident on the photo-coupler 13, the output pulses of which are counted by an electrical circuit, not shown.

Upon shutter release, the photocurrent $i_0$ resulting from the light reflection from the reflector zone 14 is detected to energize the coil 31 of the electromagnet 28, whereby the armature 29 which has been urged against the yoke 30 by the action of the drive arm 20, as illustrated in FIG. 3, is now held attracted by the yoke 30 to maintain the same condition.

Figure 4:
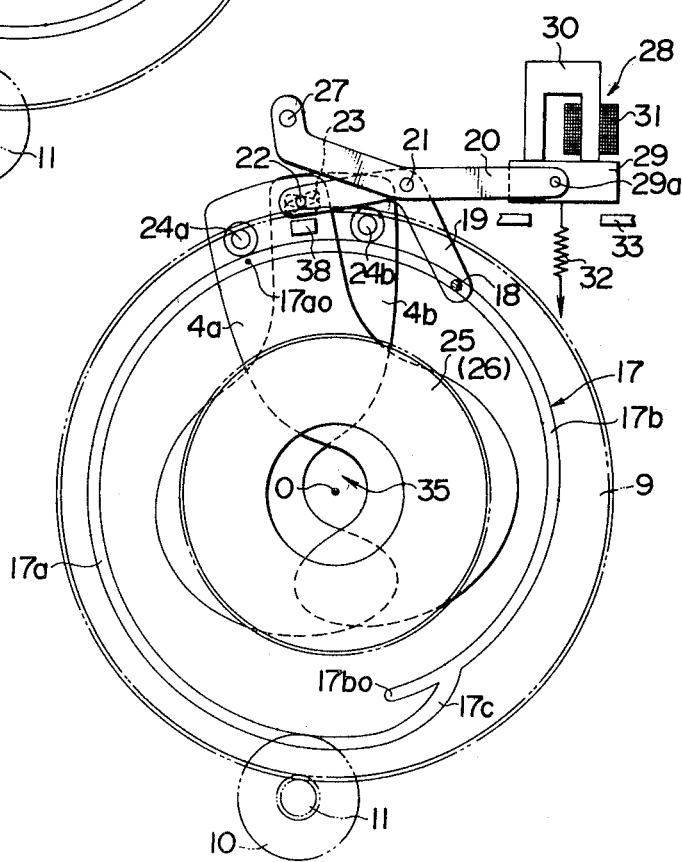

Since a counter-clockwise rotation of the ring 9 causes the cam groove 17 formed therein to rotate in the same direction, the pin 18 then moves through the cam portion 17b, starting from the junction 17a₀ as indicated in FIG. 4. Since the cam portion 17b gradually approaches the optical axis 0, which represents the center of rotation of the ring 9, as it is further removed from the initial position, the continued rotation of the ring 9 in the counter-clockwise direction from the initial position causes the pin 18 to be gradually displaced toward the optical axis 0. This causes the drive lever 19 to turn in a clockwise direction about the pin 21, whereby the drive pin 22 moves away from the stop 23 and upward or in a direction away from the optical axis 0, thus allowing the shutter blades 4a, 4b coupled to pin 22, to be gradually opened. The blades 4a, 4b define an opening 35 as they are being opened, and light from an object being photographed which impinges through the opening 35 is reflected by the film surface to be incident on the photometric element 37. It will be seen that the opening 35 increases in size as the ring 9 continues to rotate counter-clockwise from its initial position.

Where the shutter blades 4a, 4b are to operate as a programmed shutter, the rotation of the ring 9 is continued until a proper exposure is reached as determined by an output from the photometric element 37, thus increasing the size of the opening 35 formed by the blades 4a, 4b. When a proper exposure is reached, an exposure control circuit, not shown, produces an instruction to terminate the exposure, which causes the coil 31 of the electromagnet 28 to be deenergized. Thereupon, the yoke 30 ceases to produce an attracting force, and therefore the armature 29 is now allowed to move away from the yoke 30 under the bias of the spring 32 and bears against the stop 33 where it comes to a stop. Accordingly, the drive arm 20 turns clockwise about the pin 27, and hence the pin 21 mounted thereon moves downward or toward the optical axis 0. At this time, the drive lever 19 moves counter-clockwise substantially about the pin 18, causing the drive pin 22 to move toward the optical axis 0 until it bears against the stop 38, thus closing the shutter blades 4a, 4b to terminate the exposure.

If the voltage supplied to the motor 10 is maintained constant during the exposure controlled by the shutter blades 4a, 4b, the ring 9 rotates at a given speed, and the shutter blades 4a, 4b open as the ring 9 rotates, thus allowing a relatively slow initiation of an exposure. However, when a proper exposure is reached and the exposure control circuit produces an instruction to terminate the exposure, the shutter blades 4a, 4b are rapidly closed to terminate the exposure immediately upon the lapse of a time lag $\Delta t$ associated with the electromagnet 28. It is a simple matter to keep the time lag $\Delta t$ equal to or less than 0.5 m sec, and thus when the arrangement is utilized as a programmed shutter, if the instruction to terminate the exposure is produced to provide an exposure period of 1/1000 second, there results an overexposure on the order of 0.56 EV, as calculated from the equation $(2+0.5)/2^2 = 1.56$, presenting no difficulty for practical purposes.

Because a time lag associated with an electromagnet such as the electromagnet 28 is generally on the order of ±0.1 m sec, there is little variation from time to time, assuring a rapid shutter closing operation with a stable speed.

Figure 6:
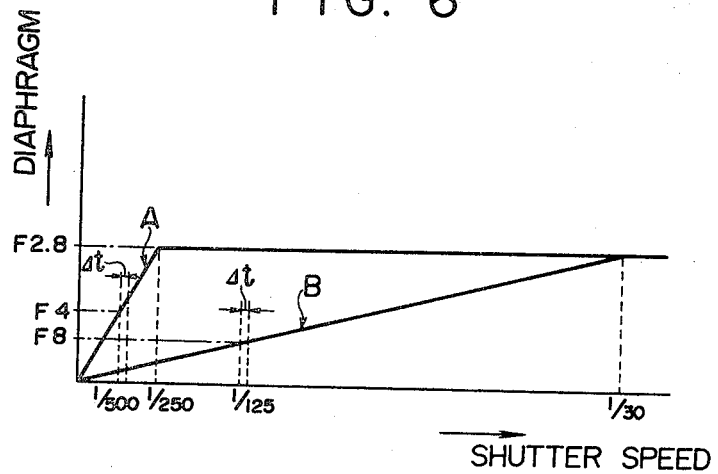
FIG. 6 graphically shows the relationship between a shutter speed and a diaphragm aperture in the lens shutter mechanism of the invention when the voltage supplied to a motor is changed.

The time required for the shutter to be opened can be shortened by supplying an increased voltage to the motor 10 to thereby increase the speed of rotation of the motor 10 and the ring 9. FIG. 6 graphically illustrates a change in the speed of rotation of a motor in response to the voltage supplied. The shutter speed is indicated on the abscissa while the diaphragm value is indicated on the ordinate. When an increased motor voltage is utilized, a shutter control takes place according to a characteristic curve A while a reduced motor voltage results in a shutter control according to a characteristic curve B. When the shutter control according to the characteristic curve A is utilized in which a shutter speed of 1/250 and F2.8 is employed, a proper exposure is reached with a diaphragm value of F4 and a shutter speed of 1/500. However, according to the characteristic curve B in which the shutter is open with the speed of 1/30, it is seen that a proper exposure is reached with a diaphragm value of F8 and a shutter speed of 1/125. Since the time lag $\Delta t$ is substantially due to the operation of the electromagnet 28, it is small in magnitude, producing little influence upon the exposure. A comparison of the characteristic curves A and B shows that an exposure error resulting from the time lag $\Delta t$ can be lessened by utilizing the shutter control according to the characteristic curve B which provides an increased exposure period.

Direct photometry of reflected light from an object being photographed which passes through the lens shutter and which is reflected by the film surface permits a shutter control in accordance with a rapid change in the light from the object being photographed.

It is to be understood that the described shutter operation can be used in cooperation with the emission of flashlight from an electronic flash. For example, if an electronic flash having a guide number GN=16 is mounted on a camera to take a picture of an object located at distance of 2 m with a film having a film speed of ASA100, the camera produces an emission signal to the electronic flash to cause the emission of flashlight therefrom when reflected light from the fourth reflector zone 15d of the reflector assembly 15 impinges upon the photo-coupler 13 during the counter-clockwise rotation of the ring 9, while simultaneously supplying an instruction to terminate the exposure to the electromagnet 28 to cause an immediate closure of the shutter blades 4a, 4b. In this manner, a synchronized photographing operation during the daytime is fully possible.

Figure 5:
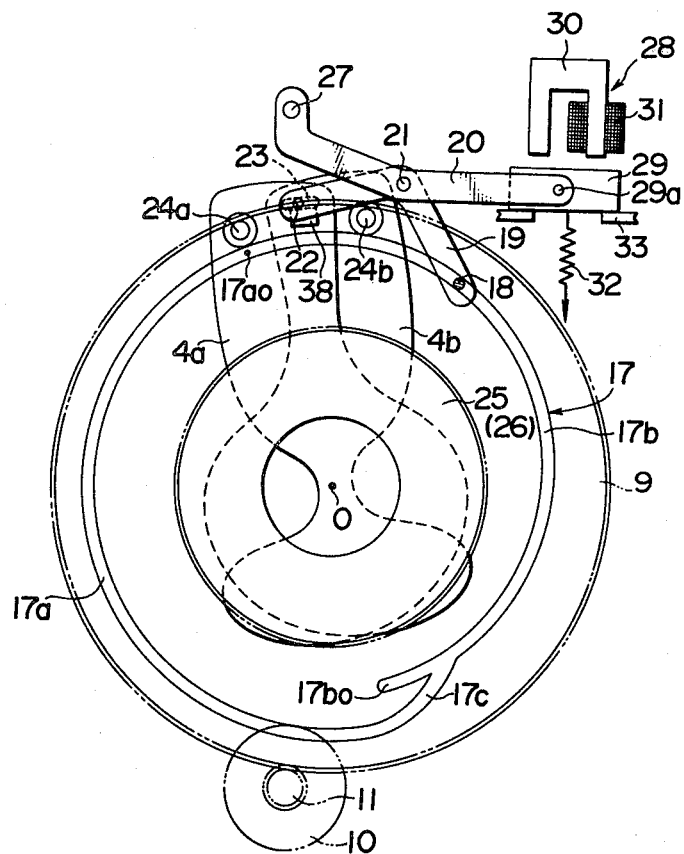

When the shutter blades 4a, 4b are closed to terminate the exposure, the rotation of the motor 10 is then interrupted, and hence the ring 9 ceases to rotate counter-clockwise. When the rotation of the motor 10 in the reverse direction is once interrupted, it then begins to rotate in the forward direction, causing the ring 9 to rotate clockwise. The rotation of the motor 10 is interrupted again when the reflector zone 14, which is utilized to detect the initial position, reaches an angular position which is located opposite to the photo-coupler 13. In the meantime, the clockwise rotation of the ring 9 causes the cam groove 17 to rotate in the same direction, so that the pin 18 which is engaged in the cam portion 17b moves in a direction away from the optical axis 0 as indicated in FIG. 5, causing the drive arm 20, which is connected with the drive lever 19, to rotate counter-clockwise about the pin 27 to return the armature 29 into abutment against the cooperating surface of the yoke 30 against the bias of the spring 32, thus returning it to its initial condition.

It will be noted that the front lens barrel 2 remains stationary at a position corresponding to a photographing distance of 2 m which is utilized during the previous photographing operation. A distance adjustment of the front lens barrel 2 takes place prior to a next photographing operation. If a photographing distance of 1 m, for example, is chosen next, the motor 10 is rotated in the forward direction to cause a clockwise rotation of the ring 9, and when the photo-coupler 13 has detected three reflector zones 16a, 16b and 16c as counted from the reflector zone 14, the lug 9a on the ring 9 abuts against the tab 2a on the front lens barrel 2 to cause the lens barrel to rotate in the same direction from that time on. When the photo-coupler 13 detects the fourth reflector zone 16d, the rotation of the motor 10 and hence the ring 9 is interrupted. At this time, the step cam 7e of the cam groove 7 formed in the front lens barrel 2 is engaged by the guide pin 8, and the lens barrel 2 is fed forward to a position corresponding to a photographing distance of 1 m.

Alternatively, when a next photographing operation utilizes an increased distance of 3 m, for example, as compared with the photographing distance of 2 m during the previous photographing operation, the forward rotation of the motor 10 causes a clockwise rotation of the ring 9. When the photo-coupler 13 detects the reflector zone 16a which is next to the reflector zone 14, the absence of abutment of the lug 9a against the tap 2a allows a continued rotation of the ring 9. Subsequently, when the lug 9a abuts against the tab 2a at a position where the photo-coupler 13 detects the second reflector zone 16b, the ring 9 continues to rotate clockwise in an integral manner with the front lens barrel 2. Then, the step cams 7c, 7d and 7e sequentially pass by the guide pin 8, whereby the front lens barrel 2 is intermittently fed forward. However, when the reflector zone 16d passes by the photo-coupler 13, the inclined rectilinear cam 7f is controlled by the guide pin 8, whereby the front lens barrel 2 is continuously fed rearwardly to a position which corresponds to a photographing distance of infinity. When both the ring 9 and the front lens barrel 2 rotate substantially through one revolution and the reflector zone 14 is opposite the photo-coupler 13, an output pulse corresponding to reflector zones of the reflector assembly 16 begins to be counted. When the photo-coupler 13 detects the first reflector zone 16a, the rotation of the motor 10 is then interrupted, whereby the ring 9 and the front lens barrel 2 cease to rotate. At this time, the step cam 7b is controlled by the guide pin 8, whereby the front lens barrel 2 comes to a stop at a position corresponding to a photographing distance of 3 m. Since the ring 9 has rotated through substantially one revolution, the cam groove 17 has also rotated clockwise substantially through one revolution, and the pin 18 has also moved substantially one revolution through the cam groove 17. Subsequently, the pin 18 shifts from the condition in which it is controlled by the cam portion 17a to a condition in which it is controlled by the cam portion 17b, whereby it is displaced toward the optical axis 0. However, during such distance adjustment, the coil 31 of the electromagnet 28 is not yet energized and yoke 30 produces no attracting force, and thus, as the pin 18 moves the drive arm 20 rotates clockwise about the pin 27 under the bias of the spring 32, maintaining the shutter blades 4a, 4b closed. As the distance adjustment is completed, the pin 18 is controlled by the cam portion 17a. Thus the arm 20 maintains the armature 29 in abutment against the yoke 30 against the bias of the spring 32. Subsequently the motor 10 rotates in the reverse direction as mentioned previously to complete the distance adjustment at the angular position of the ring 9 where the reflector zone 14 is located opposite to the photo-coupler 13. A subsequent operation of the shutter release switch energizes the electromagnet 28, which then holds the armature 29 attracted to the yoke 30. When the pin 18 moves through the cam portion 17b during a counter-clockwise rotation of the ring 9, the drive arm 19 rotates clockwise about the pin 21 to open the shutter blades 4a, 4b. Light from an object being photographed which passes through the opening 35, as reflected by the film surface, impinges upon the photometric element 37 to initiate photometry. At a time when proper exposure is reached, the electromagnet 28 is deenergized, whereupon the drive arm 20 rotates clockwise under the bias of the spring 32, thus closing the shutter blades 4a, 4b.

As mentioned previously, the shutter blades 4a, 4b are also adapted to operate as a diaphragm preset shutter. In this instance, a diaphragm value is previously chosen by a user of the camera. Assuming that the user has chosen a diaphragm value of F11, the distance adjustment is followed by an operation of a shutter release switch which causes the ring 9 to rotate counter-clockwise. When reflected light from reflector zones 15a, 15b and 15c are incident on the photo-coupler 13 to produce three pulses of photocurrent i, an instruction to stop the motor 10 is produced by an electrical circuit, not shown, thus interrupting the rotation of the motor 10. In the meantime, the pin 18 is guided by the cam portion 17b of the cam groove 17 to move toward the optical axis 0. Consequently, the drive pin 22 moves away from the stop 38 or in a direction away from the optical axis 0, thus opening the shutter blades 4a, 4b which then define a diaphragm aperture corresponding to F11. When a proper exposure period passes while the opening 35 formed by the shutter blades 4a, 4b is maintained at the diaphragm value of F11, the photometric element 37 produces an output which is in turn used to produce an instruction to terminate the exposure. In this manner, the coil 31 of the electromagnet 28 is deenergized, allowing the drive arm 20 and the drive lever 19 to operate under the bias applied by the spring 32 as before, immediately closing the shutter blades 4a, 4b to terminate the exposure.

Figure 7:
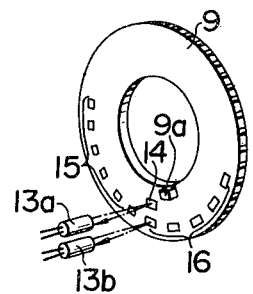
FIGS. 7 to 9 are perspective views of other forms of means which detect an angular position of the ring as used in the lens shutter mechanism of the invention.

It is to be noted that the angular position of the ring 9 is detected by the cooperation of the single photo-coupler 13 with the reflector assemblies 14, 15 and 16. As a result of differential reflectivities between the reflector assemblies 15, 16 and the reflector zone 14, a discrimination is made between the detection of the initial position and a detection which is utilized for distance adjustment or shutter control. However, rather than providing reflector zones or reflector assemblies having two different reflectivities, all of the reflector assemblies 14, 15 and 16 may have an equal reflectivity, with the reflector zone 14 being displaced from the path of the reflector assemblies 15, 16, as indicated in FIG. 7 so that the light reflection from the reflector zone 14 can be detected by a first photo-coupler 13a while the light reflection from the reflector assemblies 15, 16 can be detected by a second photo-coupler 13b.

Figure 8:
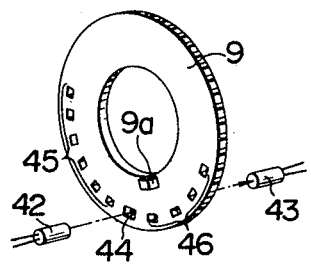

Alternatively, instead of providing the reflector assemblies 14, 15 and 16, windows 44, 45 and 46 may be formed in the ring 9 at locations corresponding to the reflector assemblies 14, 15 and 16, respectively, as indicated in FIG. 8, with a pair of elements comprising a light emitting element 42 and light receiving element 43 disposed on opposite sides of the ring 9 so that the position of each window 44, 45 or 46 may be detected by the light transmitting therethrough. In this instance, the window 44 which is utilized to detect the initial position has an area which is greater than the area of opening of the window 46 utilized for distance adjustment or the window 45 utilized for shutter control.

Figure 9:
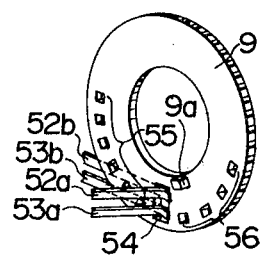

As a further alternative, the angular position of the ring 9 may be detected by means of an electrical contact which is operated mechanically. Specifically, referring to FIG. 9, there is shown a window 54 having an increased width and which is utilized to detect the initial position. Also formed in the ring 9 are windows 56 and 55 which are utilized for distance adjustment and shutter control, respectively. Two pairs of electrical contacts 52a, 52b and 53a, 53b are vertically spaced apart and disposed on opposite sides of the ring 9 so that a switch formed by each pair is closed when the contacts of each pair engage each other. The closure of the electrical contacts 52a, 52b detects the presence of the window 54 while the closure of the contacts 53a, 53b detects the presence of windows 54, 55 and 56.

Figure 10:
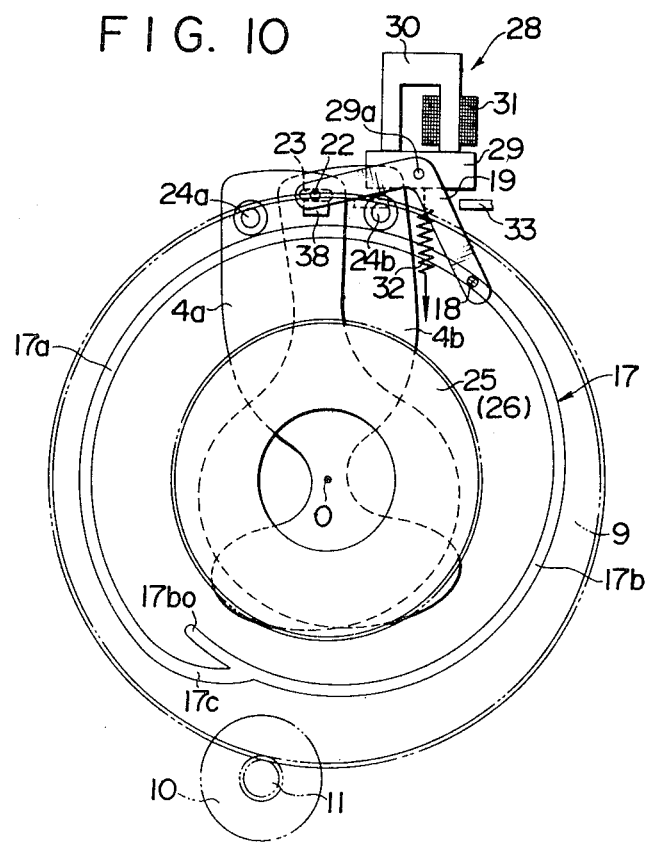
FIG. 10 is a front view of a lens shutter mechanism according to another embodiment of the invention, illustrating an initial condition thereof.

FIG. 10 is a front view of a lens shutter mechanism according to another embodiment of the invention, as the ring 9 is viewed while it assumes its initial position. In this lens shutter mechanism, the blade opening and closing, drive arm 20 is omitted while utilizing only the drive lever 19 as a blade opening and closing member. Specifically, the drive lever 19, which is generally L-shaped as before, has a portion thereof which was previously connected to the drive arm 20, but which is now directly connected rotatably to the armature 29 of the electromagnet 28 by means of a pivot pin 29a. In the initial position of the drive lever 19, a pin 18 mounted on one end thereof assumes a position which is at its maximum distance removed from the optical axis 0, whereby the armature 29 connected to the drive lever 19 is held in abutment against the cooperating surface of the yoke 30 against the resilience of the spring 32. Under this condition, the drive pin 22 mounted on the other end of the drive lever 19 assumes a position which is close to the optical axis 0 and where it bears against the stop 38, thus closing the shutter blades 4a, 4b.

During the time the ring 9 rotates clockwise for purpose of distance adjustment, the pin 18 remains stationary at the position mentioned above because of its being located in the cam portion 17a. Accordingly, the shutter blades 4a, 4b remain closed. Upon completion of distance adjustment, the ring 9 rotates counter-clockwise to return to its initial position, whereupon a shutter release switch may be operated. Thereupon, the electromagnet 28 is energized to allow the yoke 30 to hold the armature 29 attracted thereto. Subsequently when the ring 9 again rotates counter-clockwise, the pin 18 gradually moves toward the optical axis 0 while it is being guided by the cam portion 17b, and the drive lever 19 rotates clockwise about the pivot pin 19a on the armature 29 which is held attracted to the yoke 30. Thus, the drive pin 22 moves away from the stop 38 and in a direction away from the optical axis 0, whereby the shutter blades 4a, 4b are gradually opened. The opening shutter blades 4a, 4b define the opening 35 (see FIG. 4) as mentioned previously, allowing photometry of light from an object being photographed by the photometric element 37. Accordingly, when the shutter blades are to operate as a programmed shutter, an instruction to terminate the exposure is produced at the time a proper exposure is reached, thus deenergizing the coil 31 to allow the armature 29 to move away from the yoke 30, thus allowing the drive lever 19 to rotate counter-clockwise substantially about the pin 18 under the resilience of the spring 32. The drive pin 22 ultimately abuts against the stop 38 as it moves toward the optical axis 0, closing the shutter blades 4a, 4b to terminate the exposure. The ring 9 then ceases to rotate. When the shutter blades 4a, 4b are to operate as a diaphragm preset shutter, the ring 9 rotates to an angular position corresponding to a diaphragm value which is chosen by a user of the camera, whereupon the ring 9 ceases to rotate. After a proper exposure period, an instruction to terminate the exposure causes the shutter blades 4a, 4b to be closed in the similar manner as mentioned above, thus terminating the exposure.

In the described embodiments of the lens shutter camera, the motor 10 is used as a drive source to cause rotation of the lens barrel 2 and the ring 9. However, a spring may be similarly used as a drive source.

What is claimed is:

1. A lens shutter camera comprising:
   a movable lens barrel carrying a taking lens and adapted to perform a distance adjustment of the taking lens through a movement thereof;
   a first cam formed on the movable lens barrel and having a continuous excursion in the direction of the optical axis of the taking lens for performing a distance adjustment of the taking lens;
   a guide pin fixedly mounted on a stationary member which supports the movable lens barrel in a movable manner, the guide pin being adapted to engage the first cam;
   a ring disposed for rotation about the optical axis of the taking lens;
   a second cam formed in one surface of the ring and having a continuous excursion and being arranged a predetermined distance from the center of rotation thereof, the rotation of the ring in one direction causing a movement of the lens barrel and the rotation of the ring in the opposite direction occurring independent from the lens barrel and causing a shutter to be operated;
   position detecting means for detecting the initial angular position of the ring as well as an angular position corresponding to a photographing distance established and an angular position where a shutter is to be operated;
   said shutter including shutter blade means disposed in alignment with the optical axis of the taking lens so as to be opened and closed;
   a shutter controlling electromagnet;
   blade opening and closing means engageable with the second cam formed on the ring and including a spring which is used to close said shutter blade means and also including an interlocking mechanism connected to the shutter blade means and the shutter controlling electromagnet, the rotation of said ring being effective to open the shutter blade means by cooperation with the action of the second cam whenever the electromagnet is energized, the shutter blade means being closed by the spring whenever the electromagnet is deenergized;
   and a drive source for rotating the ring.

2. A lens shutter camera according to claim 1 in which the first cam comprises a stepped cam groove having a plurality of consecutive steps which are offset from each other as viewed in the direction of the optical axis of the taking lens, the stepped cam groove extending around substantially one-half the outer peripheral surface of the lens barrel, with the starting and the terminating end of the stepped cam groove being connected together by a rectilinear cam groove formed in the remaining one-half circumference of the lens barrel.

3. A lens shutter camera according to claim 1 in which the periphery of said ring is formed with teeth which mesh with a drive gear, which is in turn driven for rotation in a forward or reverse direction by the drive source.

4. A lens shutter camera according to claim 1 in which the ring has a lug projecting therefrom and which bears against a tab formed on the lens barrel thus causing the lens barrel to rotate.

5. A lens shutter camera according to claim 1 in which the second cam formed in the ring comprises a cam groove of a modified annulus formed in one surface of the ring, the cam groove including a first portion which extends around substantially one-half the circumference and being equidistant from the optical axis to produce no contribution to a shutter operation and a second portion formed by the remainder of the circumference and connected to the first cam portion, the second cam portion extending from said first cam portion gradually closer to the optical axis toward its one end, thereby contributing to a shutter opening operation.

6. A lens shutter camera according to claim 1 in which the position detecting means comprises output means disposed in opposing relationship with the ring to produce an output signal by detecting one of the selected zones on the ring, the zones formed on the ring including an initial position zone indicative of an angular position representing the initiation of rotation of the ring, a first plurality of zones offset to one side of the initial position zone for controlling a shutter operation, and a second plurality of zones offset to the other side of the initial position zone for establishing a desired photographing distance, the output means being capable of distinctively detecting the angular positions corresponding to the initial position zone and the first and the second plurality of zones.

7. A lens shutter camera according to claim 6 in which the output means comprises a photo-coupler and wherein the initial position zone exhibits a surface reflectivity which is different from the surface reflectivity of any one of the first and the second plurality of zones, whereby the photo-coupler produces an output signal of a level which permits its discrimination over an output signal corresponding to one of the first and the second plurality of zones.

8. A lens shutter camera according to claim 6 in which the initial position zone is located on one face of the ring at a radial distance from the optical axis which coincides with the intermediate portion of the ring, which distance is different from the radial distance of any one of the first and the second plurality of zones, and further including separate photo-couplers, one associated with the initial position zone and another associated with the first and the second plurality of zones to function as the output means.

9. A lens shutter camera according to claim 6 in which the output means comprises a light emitting element and an oppositely located light receiving element, all of the zones being formed by a window formed to extend through the ring, the window representing the initial position zone having an opening area which is different from the opening area of any one of the first and the second plurality of zones, thereby permitting a facilitating therebetween.

10. A lens shutter camera according to claim 6 in which the initial position zone is defined by a window extending through the ring and having a radial width which is different from the radial width of windows representing the first and the second plurality of zones, further including two pairs of conductive contacts which are disposed on opposite sides of the ring to detect the presence of a window therebetween.

11. A lens shutter camera according to claim 1 in which the interlocking mechanism of the blade opening and closing means comprises a drive lever having first and second arms and carrying a pin, which is fitted in the second cam, on the end of said first arm and carrying a drive pin in said second arm which is operable to open or close the shutter blade means, and a drive arm on which the driver lever is pivotally mounted and having the end of its first arm pivotally mounted on a stationary member, with the free end of the drive arm being connected to the electromagnet.

12. A lens shutter camera according to claim 11 in which the drive lever pin is located within a junction between the first and the second cam portion formed on the ring whenever the ring assumes its initial position, the pin being located within the first cam portion during rotation of the ring in one direction to establish a photographing distance to thereby maintain the drive lever stationary, the pin causing the drive lever to move angularly in a direction to open the shutter blade means whenever the ring rotates to the opposite side of the junction.

13. A lens shutter camera according to claim 11 in which the shutter blade means comprises a pair of blades which form a shutter of vario type and having elongated slots formed in one end thereof through which the drive pin extends, a displacement of the engaging pin in a first direction causing an angular movement of the drive lever to thereby open the shutter blades, the shutter blades being closed as the drive lever is driven for angular movement about the engaging pin by the spring.

14. A lens shutter camera according to claim 13 in which the drive pin bears against a stop formed on the body of the camera whenever the shutter blades are closed.

15. A lens shutter camera according to claim 14 in which the stop comprises an elastic member, thereby absorbing shocks as the shutter is moved to the closed condition.

16. A lens shutter camera according to claim 1 in which the electromagnet comprises a yoke fixedly mounted on a stationary member, a coil adapted to be energized, and an armature formed on the free end of the drive arm, the coil being energized in response to a shutter release operation to cause the armature to be held attracted to the yoke, the coil being deenergized in response to an instruction to terminate an exposure, whereupon the armature moves away from the yoke under the resilience of the spring.

17. A lens shutter camera according to claim 1 in which the spring extends between an armature of the electromagnet and a stationary member, thereby charging the shutter blade means for closing operation whenever the armature is held attracted to the yoke of the electromagnet.

18. A lens shutter camera according to claim 1 in which the drive source comprises a motor.

19. A lens shutter camera comprising:
a lens barrel and means for slidably mounting said lens barrel enabling the lens barrel to experience rotational and/or linear movement within said mounting means;
a first cam formed upon the periphery of said barrel and extending so as to be closed upon itself;
a stationary follower member slidably engaging said first cam for linearly moving the lens barrel as it rotates;
a rotatable ring;
drive means on said ring for imparting rotation to said lens barrel when said ring is rotated in a first direction and being released from said lens barrel when said ring rotates inn a second direction opposite said first direction; and position detection means responsive to rotation of said ring for detecting the angular distance moved by said lens barrel.

20. The lens shutter camera of claim 19 further comprising:
a shutter;
said ring having a second cam formed on one face thereof; and
shutter operating means movable between shutter open and shutter closed positions and responsive to said second cam means for opening said shutter when said ring is rotated a predetermined distance in said second direction.

21. The lens shutter camera of claim 20 further comprising:
bias means normally urging said shutter operating means toward said shutter closing position; and
restraining means responsive to a predetermined shutter speed selection for releasing said shutter operating means to cause said bias means to rapidly move said shutter operating means toward said shutter closed position to close said shutter.

22. A lens shutter camera comprising:
a ring rotatable about an axis;
a cam on one face of said ring, said cam having a curved portion extending gradually inward from one end thereof and removed from said axis to a second point closer to said axis;
a shutter;
shutter operating means responsive to rotation of said ring in a first direction for opening said shutter;
biasing means normally biasing said shutter operating means toward a first position for closing said shutter;
means responsive to completion of a shutter open interval for placing said shutter operating means under control of said bias means for closing said shutter.

23. The lens shutter camera of claim 22 further comprising:
a lens barrel having a cam on the periphery of said barrel;
a pin cooperating with said cam for linearly moving said lens barrel responsive to rotation of said barrel; and
means on said ring for rotating said barrel responsive to rotation of said ring in a predetermined direction.

24. A lens shutter camera comprising:
a shutter;
a swingably mounted shutter operating lever means rotatable about a pivot and having a first end engaging said shutter and a second end;
a ring rotatable about a predetermined axis;
a cam on one surface of said ring engaging said lever means second end, said cam moving said lever means to open said shutter when said ring is rotated in a first direction;
electromagnet means including an armature for maintaining the pivot in a fixed position;
bias means for moving said pivot; and
means responsive to a completed exposure period for deenerginzing said electromagnet to release said armature whereby said bias means moves said pivot in a direction to rapidly close said shutter.

25. The lens shutter camera of claim 24 wherein said lever means comprises a substantially L-shaped arm, the pivot being located at the knee of said arm;

said cam engaging one free end of said L-shaped arm;
said shutter engaging the remaining free end of said L-shaped arm;
said armature engaging said pivot.

26. The lens shutter camera of claim 25 further comprising a resilient stop member positioned in the path of said one free end of said L-shaped arm for absorbing the impact of said L-shaped arm as said shutter is closed.

* * * * *

UNITED STATES PATENT AND TRADEMARK OFFICE
CERTIFICATE OF CORRECTION

PATENT NO. : 4,426,145

DATED : January 17, 1984

INVENTOR(S) : Akihiko Hashimoto

It is certified that error appears in the above-identified patent and that said Letters Patent is hereby corrected as shown below:

Column 4: Line 9, after the word "heads" insert --which--.

Column 5: Line 9, after the word "the" insert the word --lever--.

Column 6: Line 47, after the word "even" insert the word --if--.

In the Claims:

Claim 9, Column 14, Line 52, delete the words "permitting a".

Claim 9, Column 14, Line 53, after the word "facilitating" insert the words --a discrimination--.

Signed and Sealed this

First Day of January 1985

[SEAL]

Attest:

Attesting Officer

GERALD J. MOSSINGHOFF

Commissioner of Patents and Trademarks